United States Patent
Choi

(10) Patent No.: US 11,953,937 B2
(45) Date of Patent: Apr. 9, 2024

(54) APPARATUS AND METHOD FOR SYNCHRONIZING VBE CLOCK IN HVDC SYSTEM

(71) Applicant: HYOSUNG HEAVY INDUSTRIES CORPORATION, Seoul (KR)

(72) Inventor: Dong Min Choi, Suwon-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 202 days.

(21) Appl. No.: 17/622,648

(22) PCT Filed: Jan. 12, 2021

(86) PCT No.: PCT/KR2021/000376
§ 371 (c)(1),
(2) Date: Dec. 23, 2021

(87) PCT Pub. No.: WO2021/149957
PCT Pub. Date: Jul. 29, 2021

(65) Prior Publication Data
US 2022/0357764 A1    Nov. 10, 2022

(30) Foreign Application Priority Data

Jan. 20, 2020    (KR) .................... 10-2020-0007522

(51) Int. Cl.
 *G06F 1/12* (2006.01)
 *G06F 1/08* (2006.01)
 *H02J 3/36* (2006.01)

(52) U.S. Cl.
CPC .............. *G06F 1/12* (2013.01); *G06F 1/08* (2013.01); *H02J 3/36* (2013.01)

(58) Field of Classification Search
CPC ........................................................ G06F 1/12
USPC ........................................................ 327/141
See application file for complete search history.

(56) References Cited

U.S. PATENT DOCUMENTS

| | | | |
|---|---|---|---|
| 9,479,043 B2 | 10/2016 | Jiang et al. | |
| 2018/0011482 A1* | 1/2018 | Ko | G05B 23/0267 |
| 2018/0016855 A1 | 6/2018 | Kim et al. | |

FOREIGN PATENT DOCUMENTS

| | | |
|---|---|---|
| JP | 2012-191330 A | 10/2012 |
| KR | 10-2008-0090125 A | 10/2008 |
| KR | 10-2012-0020867 A | 3/2012 |
| KR | 10-2016-0081575 A | 7/2016 |
| KR | 10-2018-0067905 A | 6/2018 |
| WO | 2009055931 A1 | 5/2009 |

* cited by examiner

*Primary Examiner* — Tomi Skibinski
(74) *Attorney, Agent, or Firm* — NKL Law; Jae Youn Kim

(57) ABSTRACT

The present invention relates to an apparatus and a method for synchronizing a clock of VBE in a HVDC system capable of increasing reliability by synchronizing the clock of the VBE in the HVDC system to suppress harmonic generation and generate duplicate clock to supply stable clock to submodules. The apparatus for synchronizing the clock of the VBE in the HVDC system comprises an operation board for creating a reference clock and an interface board for controlling submodules on or off being synchronized to a reference clock.

10 Claims, 5 Drawing Sheets

APPARATUS AND METHOD FOR SYNCHRONIZING VBE CLOCK IN HVDC SYSTEM

FIELD OF THE INVENTION

The present invention relates to an apparatus and a method for synchronizing a clock of valve base electronics (VBE) in a High-Voltage Direct Current (HVDC) system, and more particularly to, the apparatus and the method for synchronizing a clock of VBE in the HVDC system capable of improving quality of the HVDC system with multiple submodules connected to the VBE controlled to be simultaneously turned on and off.

BACKGROUND OF THE INVENTION

Recently, to connect a power system, there has been an increasing interest in a method for connecting a power system by converting AC power to DC power rather than a method for connecting an AC power system. Even in Korea, a HVDC electric power transmission system using a power converter has been installed between Jeju and Haenam to connect power systems in Jeju and Haenam.

This refers to a method of converting high-voltage power generated from a power plant from AC power to DC power, transmitting the power, reconverting the power to AC power and supplying the power to a desired power-receiving area, and this has an advantage of having transmission efficiency at least twice compared to the AC because the DC has less transmission power loss than the AC.

Meanwhile, as a DC-DC converter for the aforementioned use of the HVDC, a modular multilevel converter (MMC) is expected to be a main device.

The MMC is composed of series-connected two or three-level converters with IGBT modules in small capacity. In particular, the MMC for the HVDC is composed of a plurality of converter arms, and each arm connects series-connected multiple submodules.

This has an advantage that a harmonic filter is not necessary because it may suppress harmonics by controlling switching operations with lower conversion loss because it converts directly one DC voltage to another DC voltage, and high-voltage and/or high-capacity configurations are also easy by serially connecting submodules.

Meanwhile, studies to increase precision of submodules to turn ON or OFF have been consistently performed.

For an example, Korean Patent Laid-Open Patent No. 10-2011-0006058 suggested a method for increasing precision of transformer tap control by performing transformer tap control in use of both difference of DC voltage and that of firing angle, or both difference of DC voltage and that of extinction angle.

However, it has a disadvantage of failing to suggest how to solve harmonic generation because a controller does not supply the clock of each submodule simultaneously.

DETAILED EXPLANATION OF THE INVENTION

Technical Problem

The object of the present invention is to provide an apparatus and a method for synchronizing a clock of VBE in a HVDC system that suppresses harmonic generation from output of the HVDC.

The other object of the sent invention is to provide an apparatus and a method for synchronizing a clock of VBE in a HVDC system capable of increasing reliability of the HVDC system by duplicating clock generation and supplying a stable clock to a submodule.

Means of Solving the Problem

An apparatus for synchronizing a clock of VBE in a HVDC system in accordance with the present invention may comprise: an operation board for generating a reference clock; and interface boards for controlling submodules on and off by being synchronized to the reference clock.

Herein, the operation board may include: a first operation board that operates as either master or slave one; and a second operation board that operates as slave if the first operation board is master and operates as master if the first operation board is slave.

In addition, each of the first operation board and the second operation board may contain: a one-pulse-per-second (1PPS) signal inputting unit for inputting a 1PPS reference signal from a time server; a system clock-generating unit for generating a system clock in the first operation board itself; an error compensation module for compensating an error between an output of the 1PPS signal-inputting unit and that of the system clock-generating unit; an error compensated clock generating unit for generating a clock by compensating the error; and a clock synchronization module for performing synchronization with a reference clock outputted from the second operation board.

Herein, if the clock synchronization module fails to receive a reference clock from the second operation board, the operating board may be switched over to the master one.

Moreover, if the error of the 1PPS reference signal is equal to or exceeds a preset value, the clock synchronization module may output a reference signal by reflecting a clock of the error compensated clock generating unit.

Herein, each of the interface boards may include: a clock receiving unit for receiving reference clocks from the first operation board and the second operation board; a reference clock selecting unit for selecting the reference clock from one of outputs of the clock receiving unit; an internal clock generating unit for generating a clock in the each of the interface boards; and an error compensation module for compensating an output of the internal clock generating unit and an output of the reference clock selecting unit and supplying it as reference clock in the each of the interface boards.

Furthermore, the each of the interface board may be connected with multiple submodules by one-to-one communication, and the number of the submodules may be determined depending on the capacity of the HVDC system.

In addition, the number of the interface boards may be determined depending on the number of submodules and the number of communication ports of the interface boards.

A method for synchronizing a clock of VBE in a HVDC system in accordance with another example embodiment of the present invention may comprise: a step of a 1PPS signal-inputting unit inputting a 1PPS signal from a time server, and a system clock-generating unit generating a system clock; a step of a system clock-generating unit determining whether the system clock is normal or not; a step of the 1PPS signal-inputting unit determining whether the 1PPS signal is normal or not if the system clock is determined to be normal at the step of determining whether the system clock is normal or not; and a step of an error compensation module calculating an error of the system clock and the 1PPS signal and delivering the error to an error compensated clock generating unit, if the 1PPS signal is determined to be normal at the step of determining whether the system clock is normal or not.

Herein, the step of determining whether the system clock is normal or not further include: a step of determining a system clock error if the system clock is determined not to be normal; and a step of performing switchover of the operation board and delivering a result of the switchover to a clock synchronization module.

Besides, the step of determining whether the 1PPS signal is normal or not may further include a step of determining loss of a function of a time server if the 1PPS signal is determined not to be normal, and delivering it to the clock synchronization module.

Effects of the Invention

An apparatus and a method for synchronizing a clock of VBE in a HVDC system in accordance with the present invention has an advantage of suppressing harmonic generation of the output of the HVDC.

The apparatus and the method for synchronizing a clock of VBE in a HVDC system in accordance with the present invention has the other advantage of increasing reliability of the HVDC by duplicating clock generation and supplying a stable clock to a submodule.

DETAILED DESCRIPTION OF THE PREFERRED EMBODIMENTS

Detailed example embodiments to implement the present invention will be explained below by referring to attached drawings.

The present invention may be altered in a variety of ways, and have several example embodiments. Specific example embodiments will be illustrated in drawings and detailed explanation will be made. This is not intended to limit the present invention in a specific embodiment, but it may be understood to include all alterations, equivalents and substitutes included in the thought and technical scope of the present invention.

Below will be detailed explanations on an apparatus and a method for synchronizing a clock of VBE in a HVDC system in accordance with the present invention by referring to attached drawings.

Figure 1:
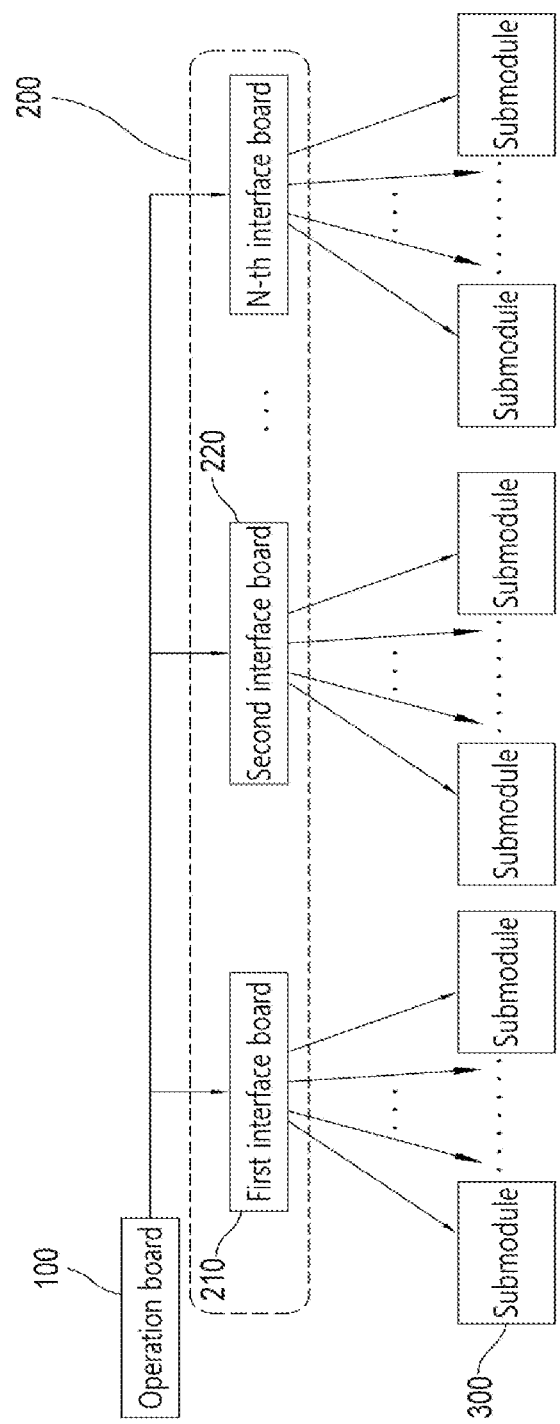
FIG. 1 is a block diagram representing an apparatus for synchronizing a clock of VBE in a HVDC system in accordance with one example embodiment of the present invention.
Figure 2:
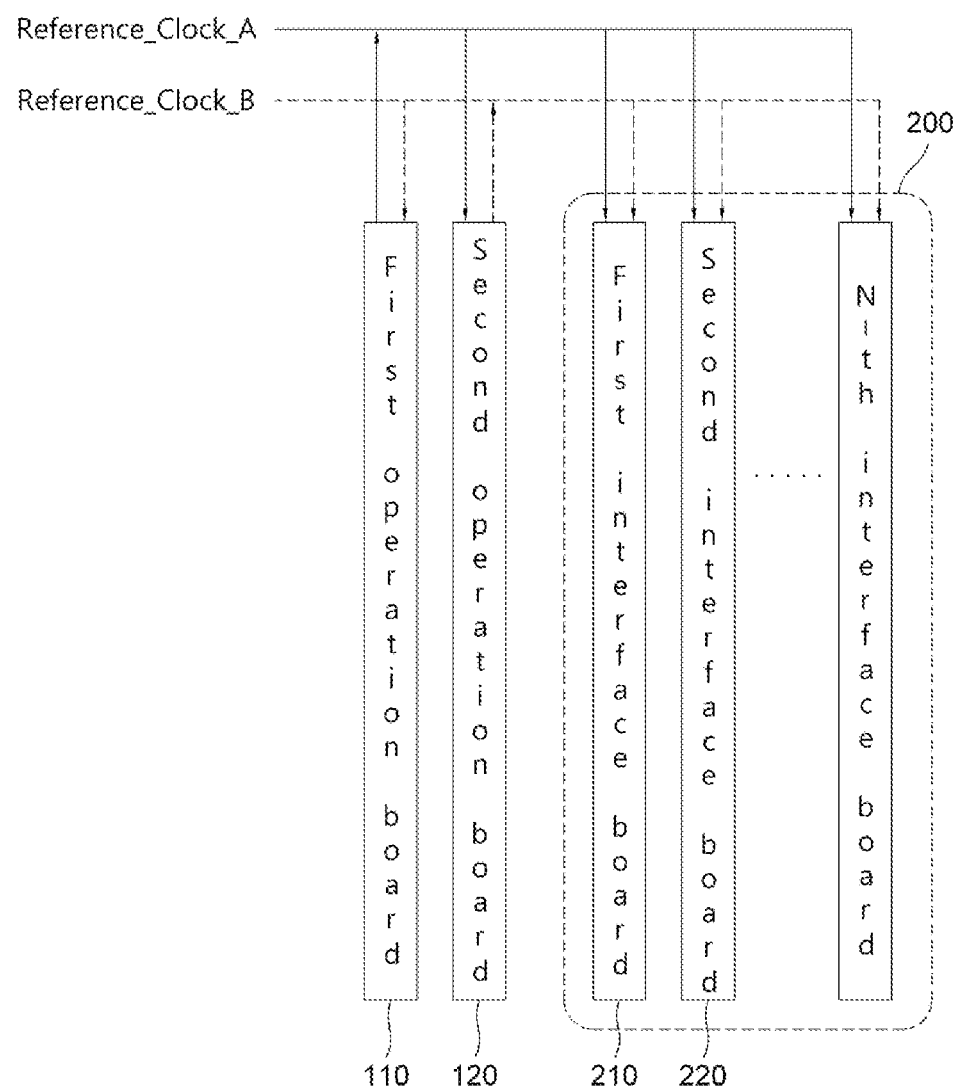
FIG. 2 is a block diagram illustrating an example configured to make an operation board in FIG. 1 duplicated.
Figure 3:
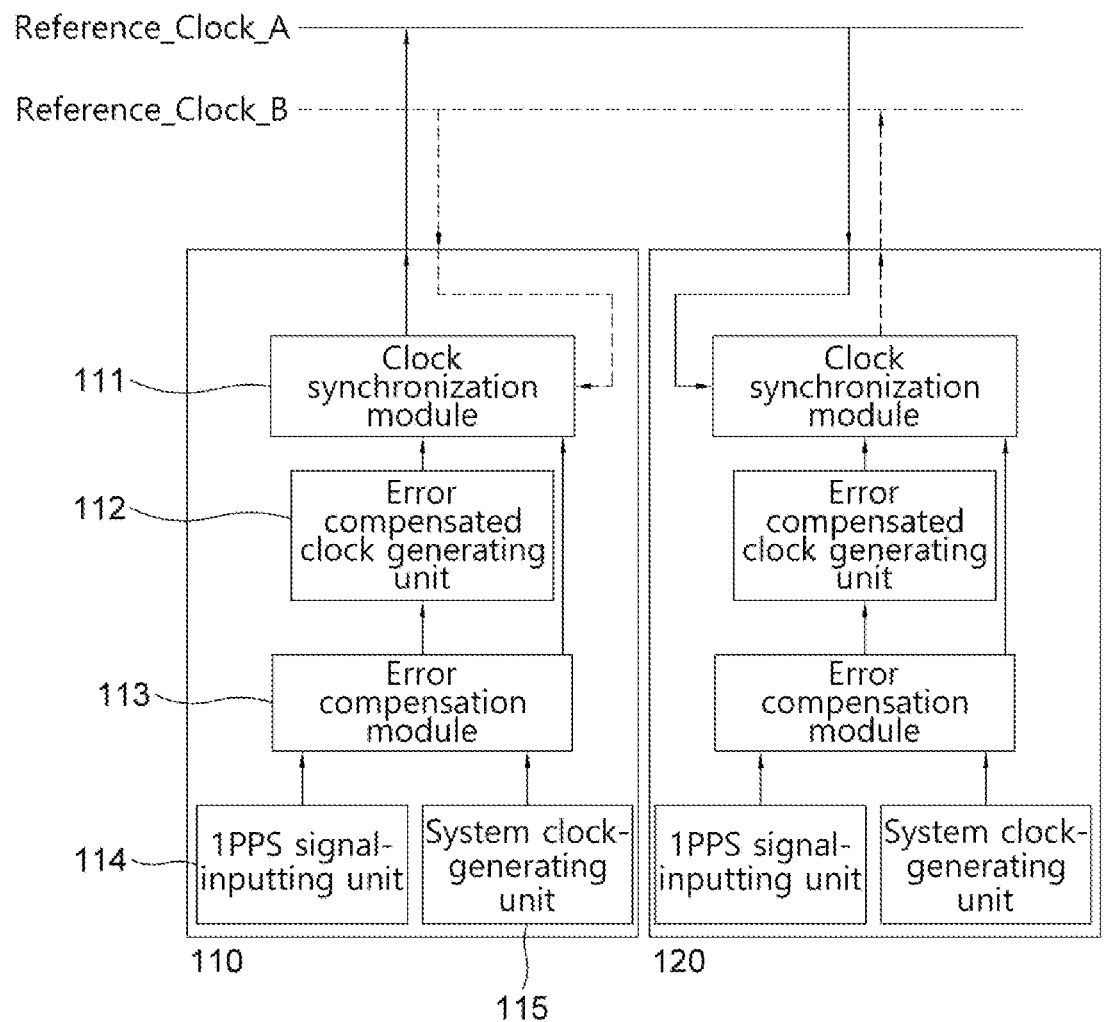
FIG. 3 is a block diagram illustrating a first operation board and a second operation board in FIG. 2 in detail.
Figure 4:
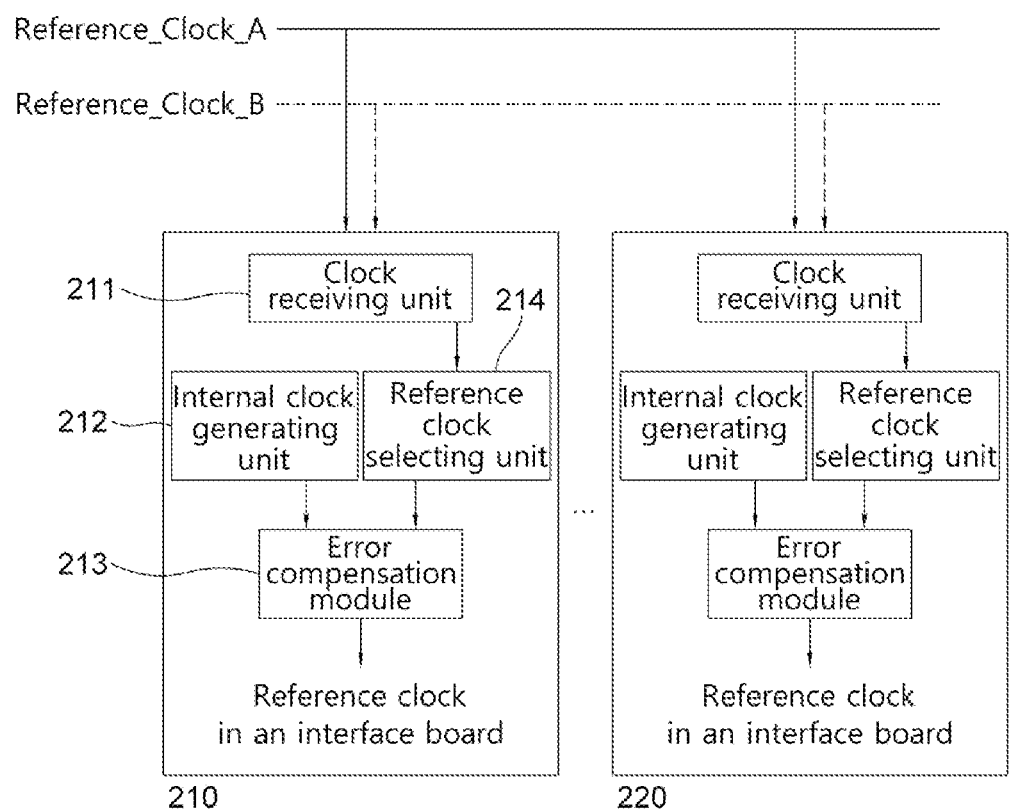
FIG. 4 is a block diagram illustrating interface boards in FIG. 2 in detail.

FIG. 1 is a block diagram representing an apparatus for synchronizing a clock of VBE in an HVDC system in accordance with one example embodiment of the present invention, and FIGS. 2 to 4 are detailed block diagrams to explain FIG. 1 in detail.

Below are explanations on an apparatus and a method for synchronizing a clock of VBE in a HVDC system in accordance with one example embodiment of the present invention by referring to FIGS. 1 to 4.

First of all, by referring to FIG. 1, an apparatus for synchronizing a clock of VBE in an HVDC system in accordance with one example embodiment of the present invention comprises: an operation board 100 for generating a reference clock, and interface boards 200 for controlling one of submodules 300 on and off by being synchronized to the reference clock.

Through a command acquired from a non-illustrated controller which is placed higher in the hierarchy, the operation board 100 generates a firing signal, for which an IGBT of the one of the submodules 300 is turned on or off, and delivers it to the one of the interface boards 200. After that, the one of the interface boards 200 delivers the firing signal acquired from the operation board 100 to the one of the submodules 300.

Meanwhile, the interface boards 200 acquire information on the state, voltage, temperature, etc. of the submodules 300, and deliver the information to the operation board 100. After that, the operation board 100 performs a role of delivering the information to the non-illustrated controller and an operating system, which are placed higher in the hierarchy.

At the time, one of the interface boards 200 performs multiple submodules 300 by one-to-one communication, and the number of communication ports connected to the number of submodules 300 may be different depending on specification of the interface boards 200.

In addition, the number of the submodules 300 may be determined depending on the capacity of the HVDC system, and even the number of the interface boards 200 may be changed according to the number of the submodules 300. In other words, the interface boards 200 may be properly equipped depending on the number of the submodules 300, and as shown in the drawings, they may include a first interface board 210, a second interface board 220 through an N-th interface board.

For example, if 16 submodules 300 are connectable to one of the interface boards 200, and there are seven interface boards 200, the number of all submodules 300 may be at least 97 and up to 112.

Similarly, if 16 submodules 300 are connectable to one of the interface boards 200, and 288 submodules 300 are necessary, 18 interface boards 200 may be determined to be required.

The apparatus for synchronizing a clock of VBE in the HVDC system in accordance with the present invention may receive a 1PPS signal from a time server, generate a system clock, calculate an error of the system clock and the 1PPS signal, and deliver the error to multiple interface boards 200 at the same time. This may cause outputs of multiple submodules 300 under control of the interface boards 200 to be synchronized, and significantly reduce harmonics in changes of the outputs.

Meanwhile, the apparatus for synchronizing a clock of VBE in the HVDC system in accordance with the present invention may be implemented with the operation board 100 duplicated to supply stable clock from the operation board 100. Below is an explanation on a structure of duplicating the operation boards 100 by referring to FIGS. 2 and 3.

FIG. 2 is a block diagram illustrating an example of a configuration of duplicated operation boards 100 in FIG. 1.

As can be seen in FIG. 2, the operation boards 100 may include: a first operation board 110 that operates as either master or slave one; and a second operation board 120 that operates as slave if the first operation board 110 is master and operates as master if the first operation board 110 is slave.

In other words, the first operation board 110 and the second operation board 120 may receive each 1PPS signal from a time server, and supply stable clock compared to its system clock, and at the time, either of the first operation board 110 or the second operation board 120 which supplies the stable clock first may operate as master one and then transmit operation information to the interface board 200.

However, if one of the operation boards 100 that works as master is determined to be incapable of supplying stable clock, the other one of the operation boards 100 may be switched over to master, and transmit operation information to the interface board 200.

At the time, the interface boards 200 which have received the operation information from the first operation board 110 and the second operation board 120 may be operated by using the clock of the operation board 100 which operates as master, and control their submodules 300.

As the present invention is capable of controlling multiple submodules 300 stably at the same time, and it may allow reliable submodules 300 to operate.

FIG. 3 is a block diagram representing the first operation board 110 and the second operation board 120 in detail in FIG. 2.

As can be known from FIG. 3, the first operation board 110 and the second operation board 120 may include: a 1PPS signal inputting unit 114 for inputting a 1PPS reference signal from a time server; a system clock-generating unit 115 for generating a system clock in the first operation board 110 itself; an error compensation module 113 for compensating an error between an output of the 1PPS signal-inputting unit 114 and that of the system clock-generating unit 115; an error compensated clock generating unit 112 for generating a clock by compensating the error; and a clock synchronization module 111 for performing synchronization with a reference clock outputted from the second operation board 120.

Herein, if the clock synchronization module 111 fails to receive a reference clock from the second operation board 120, the operating board may be switched over to the master one.

In addition, if the error of the 1PPS reference signal is equal to or exceeds a preset value, the clock synchronization module 111 may output a reference signal by reflecting a clock of the error compensated clock generating unit 112.

In short, the apparatus for synchronizing a clock of VBE in the HVDC system may receive a 1PPS signal from the time server from the 1PPS signal-inputting unit 114 and determine whether the 1PPS signal is normal or not. The system clock-generating unit 115 may generate system clock, and determine whether the system clock is normal or not. If the system clock and the 1PPS signal are normal, error of the system clock and the 1PPS signal may be calculated and compensated to the system clock by the error compensated clock generating unit 112 and then delivered to the clock synchronization module 111.

Meanwhile, if the system clock is not normal, the switchover of the operating board may be performed, and the result of the switchover may be delivered to the clock synchronization module 111, and if the 1PPS signal is determined not to be normal, the function of the time server may be determined to be lost and the result of the determination may be delivered to the clock synchronization module 111.

Accordingly, while the first operation board 110 operates as master, as explained above, if whether the clock is normal or not is determined, the operation board may be switched over to slave, and it may be delivered to the clock synchronization module 111. The clock synchronization module 111 may allow the interface board 200 to select and use stable clock by notifying the interface board 200 of master/slave operation information of the first operation board 110.

The present invention may operate reliable submodules 300 because it may control multiple submodules 300 stably.

FIG. 4 is a block diagram illustrating the interface boards 200 in detail in FIG. 2.

As can be seen in FIG. 4, the interface boards 200 may include: a clock receiving unit 211 for inputting reference clocks from the first operation board 110 and the second operation board 120, a reference clock selecting unit 214 for selecting a reference clock from either of outputs of the clock receiving unit 211, an internal clock generating unit 212 for generating a clock in the interface board 200, and an error compensation module 213 for supplying it as reference clock in the interface board 200 by compensating outputs of the internal clock generating unit 212 and the reference clock selecting unit 214.

The clock receiving unit 211 may receive master/slave information delivered to the first operation board 110 and the second operation board 120, and select the operation board 100 which operates as master to the reference clock selecting unit 214. Besides, the error compensation module 213 may compare an error between the clock supplied by the operation board 100 that operates as master and the clock generated by the internal clock generating unit 212, and use the error by compensating the clock generated by the internal clock generating unit 212.

Through this, the clock used by the interface board 200 may apply equally to the clock of the master of the first operation board 110 and the second operation board 120. This has an advantage of being capable of reliable operation.

Figure 5:
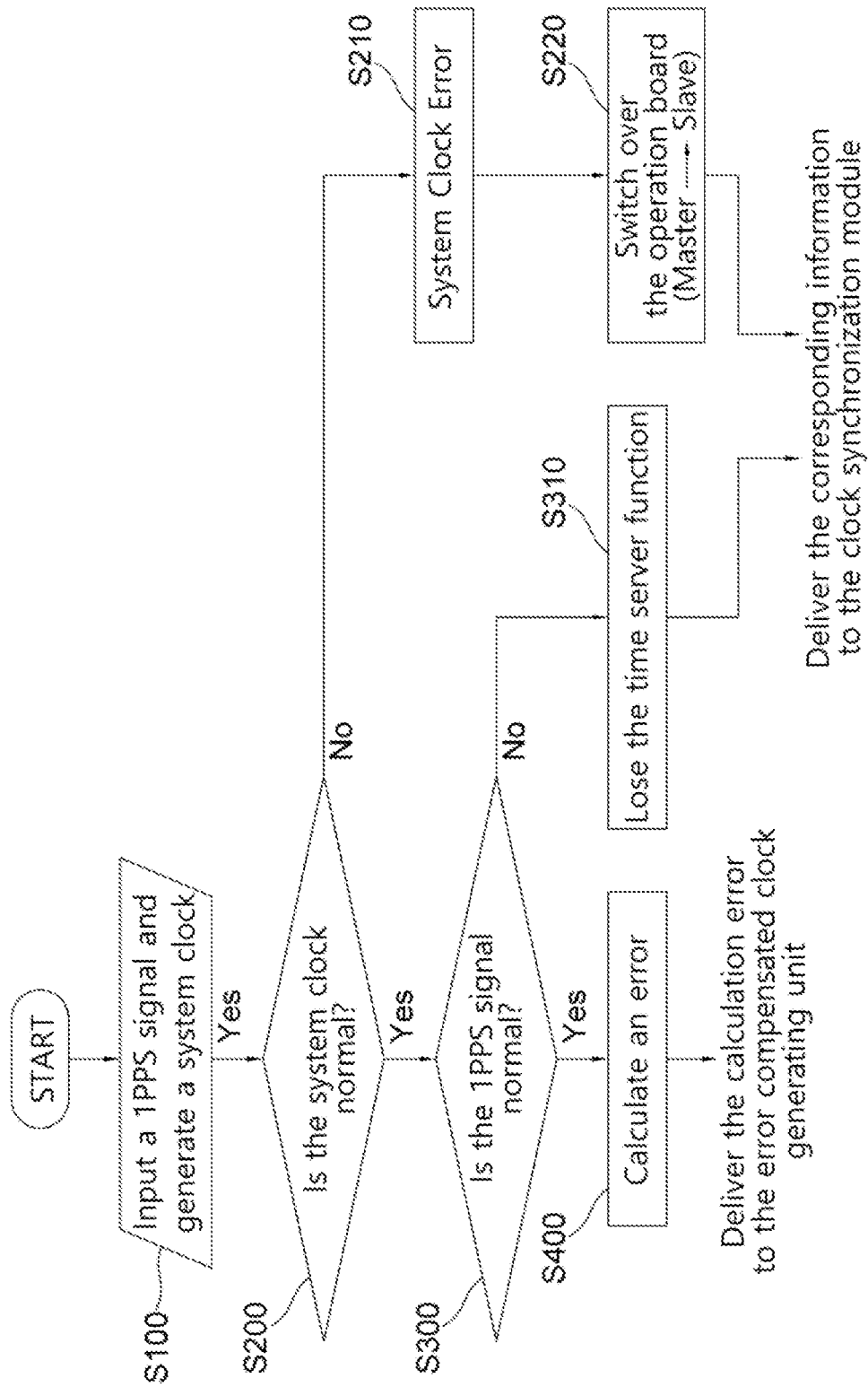
FIG. 5 is a flowchart illustrating a method for synchronizing a clock of VBE in a HVDC system in accordance with one example embodiment of the present invention.

FIG. 5 is a flowchart illustrating a method of synchronizing a clock of VBE in an HVDC system in accordance with one example embodiment of the present invention.

As can be seen in FIG. 5, the method of synchronizing a clock of VBE in the HVDC system comprises: a step S100 of inputting a 1PPS signal and generating a system clock for a 1PPS signal-inputting unit 114 inputting a 1PPS signal from a time server, and a system clock-generating unit 115 generating a system clock; a step S200 of determining whether the system clock is normal or not for a system clock-generating unit 115 determining whether the system clock is normal or not; a step S300 of the 1PPS signal-inputting unit 114 determining whether the 1PPS signal is normal or not if the system clock is determined to be normal at the step S200; and a step S400 of an error compensation module 113 calculating an error of the system clock and the 1PPS signal and delivering the error to an error compensated clock generating unit 112, if the 1PPS signal is determined to be normal at the step S300.

Herein, the step S200 of determining whether the system clock may include: a step S210 of determining a system clock error if the system clock is determined not to be normal; and a step S220 of performing switchover of the operation board and delivering a result of the switchover to a clock synchronization module 111.

In addition, the step S300 of determining whether the 1PPS signal is normal or not further may include: a step S310 of determining loss of a function of the time server if the 1PPS signal is determined not to be normal, and delivering it to the clock synchronization module 111.

The method of synchronizing a clock of VBE in the HVDC system in accordance with the present invention as seen above has an effect of being capable of significantly reducing harmonics in changes of outputs by inputting a 1PPS signal from a time server, generating a system clock in an apparatus for synchronizing a clock of VBE in the HVDC system, calculating an error between the system clock and a 1PPS signal, compensating the error, delivering it to the interface board 200 and then synchronizing output of submodules 300 under the control of the interface board 200.

As explained above, the apparatus and the method for synchronizing a clock of VBE in the HVDC system in accordance with the present invention has advantages of suppressing harmonic generation of HVDC outputs by synchronizing a clock of VBE in the HVDC system, and also increasing reliability of the HVDC by duplicating clock generation and supplying stable clock to the submodules.

Example embodiments explained above include one or more example embodiments. Of course, it can be understood that all possible combinations of components or methods for the purpose of explaining aforementioned example embodiments can be described and a lot of additional combinations and substitutions of various example embodiments can be made by those skilled in the art. Accordingly, the explained example embodiments can include all alternatives, variations and alternations in the real intention and scope of what is claimed as attached.

INDUSTRIAL AVAILABILITY

The present invention relates to an apparatus and a method for synchronizing a clock of VBE in a HVDC system, and is available in the field of HVDC.

What is claimed is:

1. An apparatus for synchronizing a clock of valve base electronics (VBE) in a high-voltage, direct current (HVDC) system, comprising:
   an operation board for generating a reference clock; and
   interface boards for controlling submodules on and off by being synchronized to the reference clock,
   wherein the operation board comprises: a first operation board configured to operate as either a master or a slave board; and a second operation board configured to operate as the slave board if the first operation board is the master board and operate as the master board if the first operation board is the slave board, and
   wherein each of the first operation board and the second operation board comprises:
   a one-pulse-per-second (1PPS) signal inputting unit for inputting a 1PPS reference signal from a time server; a system clock-generating unit for generating a system clock in the first operation board itself;
   an error compensation module for compensating an error between an output of the 1PPS signal-inputting unit and an output of the system clock-generating unit;
   an error compensated clock generating unit for generating a clock by compensating the error; and
   a clock synchronization module for performing synchronization with a reference clock outputted from the second operation board.

2. The apparatus of claim 1, wherein if the clock synchronization module fails to receive the reference clock from the second operation board, the operating board is switched over to the master one.

3. The apparatus of claim 1, wherein if the error of the 1PPS reference signal is equal to or exceeds a preset value, the clock synchronization module outputs a reference signal by reflecting a clock of the error compensated clock generating unit.

4. The apparatus of claim 1, wherein each of the interface boards comprises:
   a clock receiving unit for receiving reference clocks from the first operation board and the second operation board;
   a reference clock selecting unit for selecting the reference clock from one of outputs of the clock receiving unit;
   an internal clock generating unit for generating a clock in the each of the interface boards; and
   an error compensation module for compensating an output of the internal clock generating unit and an output of the reference clock selecting unit and supplying it as reference clock in the each of the interface boards.

5. The apparatus of claim 1, wherein the each of the interface boards is connected with multiple submodules by one-to-one communication.

6. The apparatus of claim 1, wherein the number of the submodules is determined depending on the capacity of the HVDC system.

7. The apparatus of claim 1, wherein the number of the interface boards is determined depending on the number of submodules and the number of communication ports of the interface boards.

8. A method for synchronizing a clock of VBE in a HVDC system, comprising:
   a step of a 1PPS signal-inputting unit inputting a 1PPS signal from a time server, and a system clock-generating unit generating a system clock;
   a step of a system clock-generating unit determining whether the system clock is normal or not;
   a step of the 1PPS signal-inputting unit determining whether the 1PPS signal is normal or not if the system clock is determined to be normal at the step of determining whether the system clock is normal or not; and
   a step of an error compensation module calculating an error of the system clock and the 1PPS signal and delivering the error to an error compensated clock generating unit, if the 1PPS signal is determined to be normal at the step of determining whether the system clock is normal or not.

9. The method of claim 8, wherein the step of determining whether the system clock is normal or not further includes comprises:
   a step of determining a system clock error if the system clock is determined not to be normal; and
   a step of performing switchover of the operation board and delivering a result of the switchover to a clock synchronization module.

10. The method of claim 8, wherein the step of determining whether the 1PPS signal is normal or not further comprises a step of determining loss of a function of a time server if the 1PPS signal is determined not to be normal, and delivering it to the clock synchronization module.

\* \* \* \* \*